United States Patent [19]

Shepard et al.

[11] Patent Number: 5,109,049
[45] Date of Patent: Apr. 28, 1992

[54] NYLON CARRIER FOR POLYMER CONCENTRATE, AND FILMS AND PACKAGES MADE WITH THE CONCENTRATE

[75] Inventors: Mary E. Shepard, Oshkosh; Deane E. Galloway; Keith D. Lind, both of Appleton, all of Wis.

[73] Assignee: American National Can Company, Chicago, Ill.

[21] Appl. No.: 418,004

[22] Filed: Oct. 31, 1989

Related U.S. Application Data

[62] Division of Ser. No. 88,344, Aug. 24, 1987, Pat. No. 4,877,684.

[51] Int. Cl.⁵ .................................................. C08K 3/26
[52] U.S. Cl. ................................... 524/425; 523/351; 524/451; 524/538
[58] Field of Search ................ 523/351; 524/425, 451, 524/538

[56] References Cited

U.S. PATENT DOCUMENTS 3,995,084  11/1976  Berger et al. ..................... 524/538
4,837,265  6/1989  Istel et al. .......................... 523/351

Primary Examiner—Paul R. Michl
Assistant Examiner—Edward Cain
Attorney, Agent, or Firm—Robert A. Stenzel

[57] ABSTRACT

Improved polymer additive concentrate compositions used in nylon film layers. The improved concentrate comprises a carrier of a nylon polymer composition and the additive material. Preferred nylons include nylon 6; nylon 6,66; nylon 6,6; and combinations thereof. Preferred additives are antiblock agents and slip agents. The film layers may comprise a single layer nylon film, or may be part of a multiple layer composition. The films are susceptible to being used in making packaging.

17 Claims, No Drawings

NYLON CARRIER FOR POLYMER CONCENTRATE, AND FILMS AND PACKAGES MADE WITH THE CONCENTRATE

This is a division of application Ser. No. 07/088,344, now U.S. Pat. No. 4,877,684 filed Aug. 24, 1987.

BACKGROUND OF THE INVENTION

This invention pertains to the use of nylon in packaging, and especially where additives are to be incorporated into the nylon composition.

Typically, polymer compositions are supplied to fabricators as pellets. It is most convenient that any material which is to be incorporated into the polymer composition in the fabrication of a shaped product with the polymer also be in the form of pellets. The fabricator can then mix the appropriate quantity of the additive pellets with the polymer pellets to obtain the desired composition of polymer plus additive.

Additives, in general, are not obtained from their manufacturers in pellet form. For example, slip agents are typically oily in nature and are not susceptible to being fabricated directly into pellets. Antiblock agents are solid in nature, and their fabrication into pellets the size of the polymer pellets delivered by the polymer manufacturer would prevent their proper dispersion in the overall polymer composition when an article is fabricated from the polymer. It is critical that solid particles be very small in size as compared to the typical size of pellets delivered by the polymer manufacturer. Such polymer pellets are of the order of 3 mm diameter by 3-10 mm in length, for example.

In some cases, additives can be injected directly into an extruder during the extrusion process of fabricating a film. This is one way in which liquid slip agents are incorporated into extrusion operations.

Another common method of incorporating additives into a polymer composition at the time that a polymer is fabricated into a specific article is to first form a concentrate with the additive. Forming the concentrate consists of mixing the additive material into a polymeric carrier in an amount substantially greater than the amount anticipated to be used in the final product. In general, the greatest economy of process is obtained where the additive material is incorporated into the concentrate in as great an amount as possible. For example, some additives can be incorporated into the concentrate in an amount of about 20% additive and 80% polymer. Others can be incorporated in amounts as high as 40% to 50%. Still others can be incorporated in amounts as high as up to about 80% additive, 20% polymer.

Each combination of additive and carrier polymer will have its own particular limitations as far as the maximum amount of additive which can be incorporated into that concentrate. The limitations may be, for example, the amount of the additive which may bleed out of the concentrate if the additive is generally of liquid nature. The limitation may, rather, be related to the abrasiveness of solid particulate additive materials such as silica, where the limitation is more one of the ability of the polymer to serve as a lubricant to prevent the abrasiveness of the solid silica material from severely eroding the equipment used in mixing, or otherwise forming the concentrate composition.

Certain types of additives such as pigments and fillers are incorporated into the final product, such as molded articles, in such large amounts that the additive comprises at least 20% to 50%, and sometimes up to 80% by weight of the composition of the final product. In such cases, where the additive comprises a relatively large fraction of the overall composition, it is well accepted that the carrier polymer for additive concentrates makes a significant contribution to the physical properties of the final product. So, the concentrate carrier polymer is carefully selected, as a polymer which supports the desired polymer properties. Typically, the selected concentrate carrier polymer is readily mixable with the base polymer to make a uniform blend. Thus, it is common for the concentrate polymer to be selected from the same family as the base polymer. Within this context, for example, a pigment or filler material to be incorporated into a polypropylene base polymer composition in an amount of 30% by weight is typically compounded into a concentrate using a polypropylene or a propylene copolymer as a carrier polymer.

On the other hand, where small amounts, namely less than 10%, of an additive material are to be incorporated into a base polymer, conventional practice has been to generally disregard the physical properties of the additive concentrate carrier polymer, and to assume that especially the physical properties of the final product will be controlled by the properties of the base polymer. In that light, the selection of an additive concentrate is based heavily on the additive content, with little significance being attributed to the carrier polymer. As such concentrates are typically used in amounts of less than 5% by weight, most commonly about 2%-3%, conventional knowledge holds that the composition of the carrier polymer can safely be ignored. Thus, the readily available concentrates using olefinic carriers such as ethylene and its copolymers are conventionally used, and are routinely specified for use, in small amounts in such engineering resins as nylon, polyester, and the like.

Additive concentrates are available commercially, and are used in substantial quantities in modifying the properties of a wide variety of polymer compositions. The inventors herein have found that these commercially available concentrates work relatively well with certain polymers, and especially chemically related olefin polymers and copolymers; but that the commercially available additives tend to cause certain reductions in desirable properties when incorporated into nylon compositions, even in small amounts. For example, the haze level is increased and the tensile strength tends to be decreased, with addition of only 2%-3% conventional additive concentrate. Certain of the other strength properties are likewise somewhat degraded by the incorporation of the concentrate additive. However, in some cases, it is highly desirable to include the additive composition in the nylon to obtain certain desirable properties. In those applications, the instant inventors have found that the incorporation of even small amounts of the additives to obtain the benefits thereof includes the undesirable side effect of reduction in other desirable properties.

It is an object of this invention to provide nylon compositions and films with small amounts of additive concentrates wherein the compositional combinations attenuate the reduction in the desirable properties of the nylon while incorporating into the nylon the advantageous properties of the additives.

It is another object of the invention to provide multiple layer films including a layer of nylon which incorporates the concentrate, the combination being responsible for attenuating the reduction in the beneficial nylon properties.

It is yet another object to provide packages made with films having the improved nylon compositions.

SUMMARY OF THE INVENTION

Certain of the objects of the invention are obtained in a film which has no more than 10% by weight of a polymeric additive concentrate comprising 20% to 85% by weight of a nylon polymer composition and 80% to 15% by weight of an additive, especially a solid, particulate material capable of functioning as an antiblock agent. Since slip agents are usually used in small amounts, they are also included as acceptable additions in the instant invention. Antiblock agents are preferably selected from the group consisting of inorganic spheres (especially those derived from a combination of silica and alumina), silica, talc, and calcium carbonate, or combinations of the several recited agents. The nylon carrier polymer composition is preferably selected from the group consisting of nylon 6,66; nylon 6; nylon 6,6; and combinations thereof. Preferred compositions comprise 35% to 80%, highly preferably 40% to 60% of the nylon polymer composition and 65% to 20%, highly preferably 60% to 40% of the antiblock agent. Most preferably, the composition is 50% to 60% nylon 6 and 50% to 40% of inorganic spheres. Concentrates in the same range may be used with slip agents.

In another respect, the invention is a film comprising a blend of 95% to 99.5%, preferably about 97%-98%, by weight of a first nylon composition and 5% to 0.5%, preferably about 2%-3%, by weight of the additive concentrate, wherein the additive concentrate includes the additive material incorporated into a second nylon polymer composition. A highly preferred additive is an antiblock agent, such as earlier described.

Preferably, the first and second nylon polymer compositions are compatible. The first nylon composition is desirably selected from the group consisting of nylon 6; nylon 6,6; nylon 6,66; and combinations thereof. A highly preferred first nylon composition comprises a mixture of approximately equal amounts of nylon 6 and nylon 6,66. In an especially preferred combination of the first and second nylon compositions, the first nylon composition is a mixture of approximately equal amounts of nylon 6 and nylon 6,66, and the second nylon composition is nylon 6. It is seen that the melting temperature of the second nylon composition of nylon 6 is higher thant the melting temperature of the first nylon composition of a blend of equal amounts of nylon 6 and nylon 6,66.

The nylon compositions having the novel concentrates disclosed herein are generally susceptible of being fabricated into the same products (but with improved properties) which can be made from nylon compositions using other conventionally available additives. In addition, the compositions may be used in certain difficult forming conditions to fabricate especially films of a quality not otherwise obtainable using the same nylon composition, but with conventional small amounts of conventional concentrate additives. The novel nylon compositions are especially advantageously used in fabricating single and multiple layer films for use in packaging. Particularly, the modified nylon compositions, using the novel concentrates herein are advantageously used in making multiple layer films having first and second surface layers. One of the surface layers comprises the nylon composition incorporating the novel concentrates in it. The other surface layer comprises a polymeric composition capable of forming a heat seal when heat is applied to the nylon surface layer and driven through the film to the other surface.

The films of the invention may be used in the fabrication of packages.

DETAILED DESCRIPTION OF THE ILLUSTRATED EMBODIMENTS

Additive concentrates are conventionally available wherein the additive material has been incorporated into a polymeric carrier such as low density polyethylene, ethylene vinyl acetate, ethylene methyl acrylate, ethylene mathacrylic acid, and others of the ethylene polymers and copolymers. Additives are typically incorporated into polymer carriers by melting the polymer carrier, mixing the additive into the melted polymer to achieve a uniform dispersion, then extruding pellets and solidifying the pellets. Achievement of a uniform dispersion in the concentrate is important to achieving uniform properties in the final product. It is, of course, advantageous to the compounder of additive concentrates to operate the concentrate compounding process with the same materials for as long a period as possible, to minimize the unproductive downtime associated with material changes. The process of changing materials, and especially the polymer carrier in the mixing equipment, may include, for example, a shutdown of the equipment, and sometimes a dismantling of the equipment for cleaning of its internal surfaces. Since shutdown, dismantling of equipment, and hand cleaning are so costly, compounders of additive concentrates generally provide their concentrates within families of polymers that are narrowly defined in terms of their polymeric composition ranges. For example, compounders normally make concentrates whose carrier polymers are confined to the olefin family of polymers; and especially ethylene polymers and copolymers.

Similarly, equipment which is designed to melt and mix ethylene polymers and copolymers is generally less adapted for forming uniformly blended mixtures of additives in other families of polymeric compositions. Properties such as melting temperature, softening temperature, viscosities, sheer rates, and the like vary so much with individual polymers that the compounding of uniform mixtures of polymers depends on the equipment available; as different equipments are required for the efficient processing of different polymers.

Additive concentrates conventionally available have been generally limited to the propylenes and ethylenes, and especially low density polyethylene, and certain of the ethylene copolymers such as ethylene vinyl acetate, and ethylene methylacrylic acid.

Polymer additive concentrates commercially available from concentrate compounders typically contain a minimum of 20%, typically 40% to 60%, and up to 80% of the additive component, with the balance of the concentrate composition comprising the carrier polymer. The concentrate is typically incorporated into the polymer composition of the finished product in an amount no greater than 10% by weight of the final polymer composition overall. Normal ranges of concentrate addition into a polymer composition are 0.5% to 5% by weight, most commonly 2% to 3%. The lower threshold of 0.5% represents the minimum amount of an additive concentrate which normally is needed to effect a noticeable change in a property of the polymer compound. Where smaller amounts are effective, they will apply.

It has been commonly accepted that the concentrate is present in the polymer composition of the finished product in such a small amount that the properties of the polymer which comprises the carrier in the concentrate can usually be safely ignored when determining or predicting the properties of the overall finished product polymeric composition. Surprisingly, the applicants herein have found that when the additive concentrate is to be used to modify the properties of a nylon polymer composition, even in small amounts, substantial benefit can be obtained by incorporating the additive into a concentrate which uses a nylon polymer as the carrier in the compounding of the concentrate; even where the amount of concentrate used in the nylon polymer composition is less than 5%, especially in the range of 2% to 3% by weight, and even as low as 0.5% of the overall nylon composition.

The concentrate composition is 20% to 85% by weight, preferably 35% to 80%, highly preferably 40% to 60%, and most preferably 50% to 60% of the nylon polymer, and conversely 80% to 15%, preferably 65% to 20%, highly preferably 60% to 40%, and most preferably 50% to 40% of the additive material.

While the nylon composition in the concentrate may be selected with a substantial degree of freedom, and depending on which nylon polymer is anticipated to be used as the basic composition into which the concentrate is to be incorporated, the nylon carrier in the concentrate should generally be compatible with the nylon used as the basic material into which the concentrate is incorporated.

"Compatible" polymers generally means that the polymers can form a homogeneous mixture as evidenced in films formed from the mixture by an absence of whitening on thermoforming, and a low haze, generally below 7% haze, at a film thickness of about 3.0-3.5 mils. Thus, a concentrate to be incorporated into a film generally comprised of nylon 6 will be fabricated using a carrier polymer which is compatible with nylon 6. Generally, the properties of the carrier polymer will be similar to the properties of the material into which the concentrate is to be incorporated.

Substantial quantities of packaging films are made with nylon polymer layers, and especially nylon 6, and nylon 6,66, and mixtures thereof. Nylon 6,66 is generally desirable because it can be processed and fabricated at a relatively low temperature. Nylon 6 is sometimes preferred because it is comparatively inexpensive and has a higher heat tolerance. Where even higher heat tolerance applications are dictated, nylon 6,6 may be preferred to meet the heat tolerance requirements. Mixtures of nylon 6 with either nylon 6,66 or nylon 6,6 are generally known to yield a polymer composition having intermediate properties between those of the materials of which they are composed.

An especially preferred nylon composition for use in fabrication of multiple layer films for packaging of various food products is a blend of approximately equal amounts of nylon 6 and nylon 6,66. Such blends provide a combination of a generally desirable lower heat processing temperature derived from nylon 6,66, along with some of the higher heat tolerance properties derived from nylon 6. A desirable concentrate for incorporation into the blend of nylon 6 and nylon 6,66 uses a carrier of nylon 6.

Especially desirable concentrates for use in this invention are antiblock concentrates which are uniformly mixed throughout a nylon layer of a multiple layer film. Antiblock agents for use in this invention may be any of those generally known for use in nylon compounds, such as silica, talc, calcium carbonate, and Zeeospheres, or combinations of these agents. Zeeospheres are inorganic ceramic spheres comprising silica and alumina, and are manufactured by Zeelan Industries of St. Paul, Minn. Other conventionally known antiblock agents may likewise be used in the concentrates and polymer blends and films of the invention.

With respect to antiblock agents, and concentrates incorporating the antiblock agents, a highly preferred concentrate for use in making packaging films contemplated for use in packaging food products comprises 50% to 60% of a nylon 6 carrier and 50% to 40% of the Zeeospheres.

The overall composition of the material which is used to form the nylon layer of the packaging film is at least 90%, preferably 95%, and most preferably 97-98% of the first, and primary, nylon polymer composition. Generally, the primary nylon polymer does not exceed 99.5% of the composition, as the incorporation of at least 0.5% of the additive concentrate is generally necessary in order to obtain significant modification of the properties of the polymer composition by the concentrate. Typically 2-3% of the concentrate in the overall composition is sufficient to obtain the desired modification of properties. In some cases, higher addition rates of the concentrate are necessary, up to 5%, and in some cases up to even 10% by weight of the overall composition. Generally, no more than 10% of the concentrate is required. Use of over 10% of the additive concentrate generally leads to consideration of other properties and factors, and thus such practices are not generally considered part of this invention.

With respect to multiple layer films made using the novel nylon compositions disclosed herein, and especially those incorporating the additive concentrates using a nylon carrier, a preferred film structure has a first surface layer comprising the novel nylon composition and a second surface layer comprising a polymeric composition which is capable of forming a heat seal when heat is applied to the nylon surface layer and driven through the film to the second surface layer. The second surface layer is generally considered to be a heat sealing layer. Exemplary of materials which are typically used in the heat sealing layer in such structures are ethylene vinyl acetate, ionomer, low density polyethylene, and the like.

Exemplary of multiple layer film structures using the novel concentrates and additive-modified nylon compositions of the invention are as follows.

(a) /N/tie/E/tie/seal/ 3-6 mils
(b) /N/E/tie/EVA/seal/ 3-6 mils
(c) /N/tie/E/tie/seal/LDPE/N/tie/E/tie/seal/ 7-11 mils
(d) /N/tie/E/tie/seal/LDPE/N/E/tie/EVA/seal/ 7-11 mils
(e) /N/E/tie/EVA/seal/LDPE/N/E/tie/EVA/seal/ 7-11 mils N=Nylon
tie=Polymeric adhesive material. Exemplary of known adhesives are the Plexars, CXA's, and the like.
E=Ethylene vinyl alcohol copolymer.
seal=Heat sealable polymer compositions, such as ionomer, EVA, LDPE, and LLDPE.

EVA=Ethylene vinyl acetate.

Additionally, the invention may be embodied in non-barrier type films, such as (f)

(f) /N/tie/seal/

The films of the invention, and as illustrated in the above structures (a) through (f) are readily adapted for use in fabricating packages which are especially useful for packaging food products. The films are especially adapted for use in fabricating pouches, such as preformed bags, as are conventionally used for packaging food products, such as form, fill, and seal bags, and such as for providing lids on thermoformed trays. The films may, or may not be thermoformed. Any of the films are readily adapted for being thermoformed into trays.

Especially with respect to the (a) structure, a highly desirable composition for the nylon layer is 48.5% nylon 6, 48.5% nylon 6,66, and 3% of a concentrate comprising 60% nylon 6 and 40% Zeeospheres. The tie layers are carboxy modified ethylene vinyl acetate compositions. The sealant layer composition is, for example, an ionomer, an EVA, a LDPE, or a linear low density polyethylene (LLDPE). Other heat sealable polymer compositions will be obvious to those skilled in the art. Preferred thickness of the film is about 3 mils to about 5.5 mils when the film is to be used either in fabrication of a pouch or as lid material over a thermoformed tray. The structures (a), (b), and/or (f) may be combined by the use of any of the known means of combining films, such as adhesive lamination or extrusion lamination, in fabrication of thicker structures, such as (c)-(e). The thicker structures are then typically used in fabrication of thermoformed trays, with the thinner (a) and (b) structures being used as lid material over the thermoformed trays. Conventionally known sheet materials may be used as lidstock with the thicker forming films of this invention, such as structures (c)-(e).

In some cases, the thinner structures, as at (a) and (b) are thermoformed in fabrication of relatively shallower trays. For example, 3-4 mil films have been thermoformed in fabrication of packages for frankfurters. In such films, and using 3% of the above recited concentrate of 60% nylon 6 and 40% Zeeospheres, a substantial reduction in haze value of the flat film (before vacuum forming) was noted, as well as an absence of whitening of the film after thermoforming. The tensile strength also tends to be stronger. Clarity of the film was excellent. Gloss appeared to be improved. The ability of the packages to be run automatically on commercial packaging equipment was excellent. The comparative improvements recited herein address the properties of compositions and films of the invention which, as described, functionally include only the base nylon polymer and the nylon-based concentrate. Namely, the films of the invention, so compared, are functionally free from other components, and especially the polypropylenes, the polyethylenes, the ethylene copolymers, and the like which are conventionally used as carrier polymers in making polymer concentrates. These properties, of polymers and films of the invention, are compared to properties attained in similar films made with similar levels of additive Zeeospheres, but in conventionally available concentrates using, for example, a low density polyethylene carrier.

In typical packaging operations in which the films of the invention are used, the multiple layer sheet is fabricated as by coextrusion. An array of receptacles is then formed in the sheet as by simultaneously thermoforming the sheet into an array of thermoforming molds positioned under the sheet. The receptacles are then filled with product, and lid material is sealed over the filled receptacles, with accompanying vacuum being drawn on the contents during the sealing process. The array of filled and sealed packages is then cut into individual packages, and the individual packages are discharged from their respective mold cavities.

The process just described is generally operated without the constant attention of an operator. Thus the packaging material used in the process, and especially for fabrication of the thermoformed receptacles, must be especially compatible with use of the respective equipment. If an operator were normally present to watch the operation of the equipment, a failure of the packaging material could be corrected and cleared by the operator. However, since an operator is generally not present to oversee the operation of the equipment, any failure of the packaging material may go undetected and may contribute to further barriers and jamming of the machine before the failure is detected. Thus it is critical that the packaging material be especially compatible with the operation of the equipment and the overall process.

It is especially important that the packaging material not fail during the fabrication of the receptacle in the thermoforming step of the operation. Structures similar to the (a) structure, and using concentrates having an LDPE carrier do occasionally fail by forming a hole in the film during the fabrication of the receptacles in the thermoforming operation. The films of the invention have provided significant reduction in the number of failures for a given set of equipment operating conditions, especially noted with respect to the economical films in the thickness range of 3 to 4 mils.

Another failure typical of conventional films using the LDPE carrier concentrate is that the filled and sealed packages, which have been cut apart and are ready for ejection from the molds, tend to occasionally stick in the mold cavity. As a result, when the molds are automatically recycled in the machine for fabrication of another package, a mold which still contains a filled and sealed package which has failed to respond to the automatic equipment for ejection of the package from the mold cavity causes subsequent jamming of the machine at the time when the machine attempts to fabricate another receptacle in that mold which is still filled with the filled and sealed package. The 3 to 11 mil, especially the 7-11 mil, films of this invention, made experimentally according to structures (a)-(e), have had a "0" defect rate with respect to being discharged from the receptacle mold cavity. It is anticipated that, in a commercial operation, some low level of discharge failures will occur. But the failure rate should continue to be well below that for packages having conventionally-modified nylon layers using, for example, LDPE concentrate carrier polymers.

The selection of specifications for a film to be used in a particular package forming process depends substantially on the process equipment and the process operation. Where the packages are formed at the rate of, for example, 20 to 60 packages per minute, thin films, on the order of 3 mils to 6 mils thick are typically used. Where the package forming cycle is somewhat slower, for example 8 to 15 cycles per minute, then thicker films are typically used, generally on the order of 7 mils to 11 mils thick. The film specification further depends on the temperature to which the film is heated during the thermoforming operation and the rate of heating the film.

The multiple layer films of the invention are seen to be less sensitive to the rate of heating by the heat seal equipment, than prior art films incorporating the additive concentrate in a lower melting carrier, as the lower melting carrier, such as an ethylene polymer or copolymer, softens at a lower temperature than the nylon concentrate carriers of the films of the instant invention. Thus the films of the invention can be heated at a faster rate, without sticking to sealing equipment, than can films using conventional concentrates.

The thermoforming operation may use a vacuum of between 6 and 26 inches of Hg. Normal operating range for thermoforming processes is about 10 to about 20 inches of Hg, with the typical operation using 10 to 12 inches.

Table 1 following shows the properties of typical films of the invention, and the properties of film structures which are similar, but using conventional additive concentrates.

Referring to the tensile strength results, in embodiments B and C respectively, the tensile strengths of the films of the invention in each of those embodiments are higher than the tensile strengths of the respective Comparative Examples 1 and 2 of the prior art. Thus, the use of the nylon carrier polymer in the concentrate appears to result in an improvement in tensile strength.

With respect to Example 6 and Comparative Example 1, the first layer of nylon was 0.6 mil thick. The EVOH layer was 0.15 mil. The tie layer was about 0.3 mil. The EVA layer was 0.9 mil. The composition of the sealant layer was ionomer and it was 1.05 mils thick. The concentrate contained 60% of the carrier polymer and 40% of the Zeeospheres.

It is seen from Table 1 that the desirable properties of the film are enhanced in the films of the invention, by the novel use of a nylon carrier in the concentrate composition. Improvements are especially seen in the haze level and the gloss. Improvements are also indicated in

TABLE 1

| Embodiment | Example No | Structure Type | Amt of Conc. in Nylon Layer | Thickness, mils | Additive | Concentrate Carrier Polymer | Friction[5] $K_I$ | Friction[5] $K_F$ | Haze Before Thermoform | Haze After Thermoform | Gloss[1] | Tensile[2] |
|---|---|---|---|---|---|---|---|---|---|---|---|---|
| A | 1. | (a) | 2% | 3.5 | Zeeospheres | $N_6$[3] | .33 | .36 | 5.7 | 6.9 | 79 | 46,421 |
|   | 2. | (a) | 2% | 3.6 | Zeeospheres | $N_6$ | .35 | .33 | 4.4 | 4.3 | 82 | 44,417 |
| B | 3. | (b) | 3% | 3. | $SiO_2$ | $N_{6.66}$[4] | 0.7-2+ | 1-2+ | 3.0 | 4.2 | 76 | 24,855 |
|   | 4. | (b) | 3% | 3. | $SiO_2$ | $N_6$ | .5 | .6 | 3.6 | 5.4 | 75 | 23,657 |
|   | 5. | (b) | 5% | 3. | Talc | $N_6$ | .4 | .5 | 5.6 | 9.8 | 73 | 21,778 |
|   | Comparative #1 | (b) | 3% | 3. | $SiO_2$ | LDPE | .3 | .3 | 6.2 | 16.6 | 72 | 20,963. |
| C | 6. | (c) | 2% | 3. | Zeeospheres | $N_6$ | — | — | 4.7 | 6.6 | 71 | 17,413 |
|   | Comparative #2 | (c) | 2% | 3. | Zeeospheres | LDPE | — | — | 6.5 | 18.9 | 68 | 17,146 |

[1] 45° Angle

[2] Normalized per Nylon as fraction of the film. Average of MD and CD $\left(\frac{MD + CD}{2} \div \text{fraction nylon}\right)$.

[3] $N_6$ = Nylon 6
[4] $N_{6.66}$ = Nylon 6.66
[5] $K_I$ = Coefficient to initiate sliding. $K_F$ = force to continue existing sliding.

Films of Examples 1-6 represent three related embodiments (A, B, and C) of the invention, with the separate embodiments having structure variations the tensile strength.

Table 2 shows the results of thermoforming tests in vacuum forming cavities.

TABLE 2

| Example No. | Additive | Concentrate Carrier Polymer | Conc. Amt. in Polymer | Film Thickness Mils | Nylon as Fraction of Film Thickness | Draw Depth | Observed Film properties |
|---|---|---|---|---|---|---|---|
| Comparative #3 | $SiO_2$ | EMAA | 3% | 6 | 30% | 4¼ inch | Blowout, hazy |
| 7 | $SiO_2$ | $N_6$ | 3% | 6 | 30% | 4¼ inch | Good formability, clear |
| 8 | $SiO_2$ | $N_6$ | 3% | 6 | 30% | 4¼ inch | Excellent formability, clear |
| 9 | $SiO_2$ | $N_6$ | 3% | 6 | 15% | 3⅜ inch | Excellent formability, clear |
| 10 | $SiO_2$ | $N_6$ | 3% | 6 | 15% | 3⅜ inch | Excellent formability, clear | which preclude direct comparison of all the data between the embodiments. Whereas certain of the parameters appear to be consistent throughout the examples, others are only consistent within their own embodiments. Examples 1 and 2 represent the A embodiment. Examples 3, 4, 5 and Comparative Example 1 represent the B embodiment. Example 6 and Comparative Example 2 represent the C embodiment.

It is seen from Table 2 that extruded films using concentrates having nylon as the carrier polymer were clear, and were thermoformable, at 30% nylon thickness, under conditions too severe for the Comparative Example 3 films. The films could still be formed even when the nylon thickness was reduced by half, when the depth of the draw was reduced.

Thus it is seen that the invention provides polymeric additive concentrates for use in nylon compositions, which attenuate the reduction in the desirable properties of the nylon while incorporating into the nylon the advantageous properties of the additives.

It also provides the modified nylon compositions incorporating therein improved concentrates which attenuate the reduction in the beneficial properties of the nylon.

It further provides single and multiple layer films including a layer of nylon which incorporates the concentrate, the combination being responsible for attenuating the reduction in the beneficial nylon properties.

It finally provides packages made with films having the improved nylon compositions.

Having thus described the invention, what is claimed is:

1. A film made from a composition comprising a blend of 90% to 99.5% by weight of a first nylon polymer composition and 10% to 0.5% by weight of an additive concentrate, said additive concentrate comprising 20% to 85% by weight of a second nylon polymer composition and 80% to 15% by weight of an additive agent, wherein said additive agent is selected from the group of materials capable of functioning as antiblock agents and slip agents.

2. A film made from a composition comprising a blend of 90% to 99.5% by weight of a first nylon polymer composition and 10% to 0.5% by weight of an additive concentrate, said additive concentrate comprising 20% to 85% by weight of a second nylon polymer composition and 80% to 15% by weight of an additive agent, comprising a particulate material capable of functioning as an antiblock agent, wherein said first and second nylon polymer compositions are compatible.

3. A film as in any one of claims 1 or 2 wherein said concentrate comprises 40% to 60% of said second nylon polymer composition and 60% to 40% of said additive agent.

4. A film as in any one of claims 1 or 2 wherein said additive agent is selected from the group consisting of inorganic spheres, silica, talc, calcium carbonate, and combinations thereof.

5. A film as in any one of claims 1 or 2 wherein said first nylon polymer composition is selected from the group consisting of nylon 6; nylon 6,6; nylon 6,66; and combinations thereof.

6. A film as in claim 3 wherein said first nylon polymer composition is selected from the group consisting of nylon 6; nylon 6,6; nylon 6,66; and combinations thereof.

7. A film as in any one of claims 1 or 2 wherein said second nylon polymer composition is selected from the group consisting of nylon 6; nylon 6,6' nylon 6,66' and combinations thereof.

8. A film as in claim 4 wherein said second nylon polymer composition is selected from the group consisting of nylon 6; nylon 6,6; nylon 6,66; and combinations thereof.

9. A film as in claim 5 wherein said second nylon polymer composition is selected from the group consisting of nylon 6; nylon 6,6; nylon 6,66; and combinations thereof.

10. A film as in any one of claims 1 or 2 wherein said first nylon composition comprises a mixture of approximately equal amounts of nylon 6 and nylon 6,66 and said second nylon polymer composition comprises nylon 6.

11. A film as in claim 4 wherein said first nylon polymer composition comprises a mixture of approximately equal amounts of nylon 6 and nylon 6,66 and said second nylon polymer composition comprises nylon 6.

12. A package made with a film of any one of claims 1 or 2.

13. A package made with a film of claim 3.

14. A package made with a film of claim 4.

15. A composition of matter consisting essentially of the composition resulting from the combining of:
   (a) 90% to 99.5% by weight of a first nylon polymer composition; and
   (b) 10% to 0.5% by weight of an additive concentrate, said additive concentrate comprising 20% to 85% by weight of a polymer consisting essentially of a second nylon polymer composition and 80% to 15% by weight of an additive agent selected from the group of materials capable of functioning as anti-block agents and slip agents.

16. A method of making a polyamide composition, said method comprising the steps of:
   (a) forming a melt mixture of a first polyamide carrier polymer composition and an additive agent selected from the group of materials capable of functioning as anti-block agents and slip agents and mixing said mixture to obtain a polyamide-based concentrate;
   (b) forming said polyamide-based concentrate into solid particles;
   (c) mixing said solid particles with a second polyamide polymer composition to form a mixture comprising said concentrate and said second polyamide polymer.

17. A method as in claim 16 and including forming a melt wherein said concentrate is uniformly distributed within said second polyamide polymer composition.

* * * * *